(12) United States Patent
Wu et al.

(10) Patent No.: US 11,086,163 B2
(45) Date of Patent: Aug. 10, 2021

(54) REFLECTIVE LIQUID CRYSTAL DISPLAY AND METHOD FOR MANUFACTURING THE SAME

(71) Applicants: Beijing BOE Optoelectronics Technology Co., Ltd., Beijing (CN); BOE TECHNOLOGY GROUP CO., LTD., Beijing (CN)

(72) Inventors: Xiaojuan Wu, Beijing (CN); Chuncheng Che, Beijing (CN); Yingli Liu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 272 days.

(21) Appl. No.: 16/309,367

(22) PCT Filed: Apr. 25, 2018

(86) PCT No.: PCT/CN2018/084441
§ 371 (c)(1),
(2) Date: Dec. 12, 2018

(87) PCT Pub. No.: WO2018/228058
PCT Pub. Date: Dec. 20, 2018

(65) Prior Publication Data
US 2021/0011338 A1 Jan. 14, 2021

(30) Foreign Application Priority Data
Jun. 12, 2017 (CN) .......................... 201710439512.1

(51) Int. Cl.
*G02F 1/1335* (2006.01)
*G02F 1/1343* (2006.01)

(52) U.S. Cl.
CPC .. *G02F 1/133553* (2013.01); *G02F 1/133516* (2013.01); *G02F 1/134309* (2013.01)

(58) Field of Classification Search
None
See application file for complete search history.

(56) References Cited

U.S. PATENT DOCUMENTS 6,281,952 B1 * 8/2001 Okamoto .......... G02F 1/133514
349/106
7,649,596 B2 1/2010 Rho
(Continued)

FOREIGN PATENT DOCUMENTS

CN 1866099 A 11/2006
CN 101162306 A 4/2008
(Continued)

OTHER PUBLICATIONS

International Search Report and Written Opinion dated Jul. 12, 2018, from application No. PCT/CN2018/084441.
(Continued)

*Primary Examiner* — Ryan Crockett
(74) *Attorney, Agent, or Firm* — Arch & Lake LLP (57) ABSTRACT

A reflective liquid crystal display includes an array substrate. The reflective liquid crystal display includes a plurality of raised reflective electrodes disposed on the array substrate. The reflective liquid crystal display includes a color film substrate. The reflective liquid crystal display includes a plurality of raised electrodes are provided on the color film substrate. The array substrate and the color film substrate are disposed opposite to each other such that the raised reflective electrodes and the raised electrodes face each other.

11 Claims, 3 Drawing Sheets

(56) References Cited

U.S. PATENT DOCUMENTS

| | | | |
|---|---|---|---|
| 7,692,744 B2 | 4/2010 | Ishigaki et al. | |
| 9,280,024 B2 | 3/2016 | Chen | |
| 2004/0056999 A1* | 3/2004 | Ko | G02F 1/133555 349/114 |
| 2006/0256265 A1* | 11/2006 | Rho | G02F 1/133371 349/114 |
| 2007/0126957 A1* | 6/2007 | Kim | G02F 1/133555 349/114 |
| 2008/0055530 A1* | 3/2008 | Fan Jiang | G02F 1/133555 349/144 |
| 2008/0088776 A1* | 4/2008 | Ishigaki | G02F 1/13439 349/114 |
| 2008/0230788 A1* | 9/2008 | Fan Jiang | G02F 1/133555 257/88 |
| 2009/0046227 A1* | 2/2009 | Fan Jiang | G02F 1/133555 349/114 |
| 2010/0328290 A1* | 12/2010 | Jeong | G02F 1/136286 345/211 |
| 2011/0007252 A1* | 1/2011 | Hashimoto | G02F 1/13363 349/114 |
| 2011/0012885 A1* | 1/2011 | Saitoh | G02F 1/133707 345/211 |
| 2011/0255039 A1* | 10/2011 | Enomoto | G02F 1/133555 349/113 |
| 2015/0097191 A1 | 4/2015 | Chen | |
| 2018/0203269 A1* | 7/2018 | Tamaki | G02F 1/133345 |
| 2019/0227379 A1* | 7/2019 | Wu | G02F 1/133514 |

FOREIGN PATENT DOCUMENTS

| | | | |
|---|---|---|---|
| CN | 103558718 A | | 2/2014 |
| CN | 205787482 U | * | 12/2016 |
| CN | 205787482 U | | 12/2016 |
| CN | 107102470 A | | 8/2017 |
| KR | 20040039988 A | | 5/2004 |
| KR | 20070096511 A | | 10/2007 |
| KR | 100785198 B1 | | 12/2007 |
| KR | 100931588 B1 | * | 12/2009 |
| KR | 100931588 B1 | | 12/2009 |

OTHER PUBLICATIONS

Chinese Office Action dated Jul. 27, 2020, from application No. 201710439512.1.

* cited by examiner

REFLECTIVE LIQUID CRYSTAL DISPLAY AND METHOD FOR MANUFACTURING THE SAME

CROSS REFERENCE OF RELATED APPLICATIONS

The present application is based on International Application No. PCT/CN2018/084441, filed on Apr. 25, 2018, which is based on and claims the priority of Chinese Patent Application No. 201710439512.1, filed on Jun. 12, 2017, and the entire contents thereof are incorporated herein by reference as part of the present application.

TECHNICAL FIELD

The present disclosure relates to the field of display device technologies, and in particular, to a reflective liquid crystal display and a method for manufacturing the same.

BACKGROUND

With rapid development of the display industry, LCD screens, such as mobile phones, computers, televisions, watches, pads, electronic labels and so on, have been distributed in all aspects of people's lives. With gradual strengthening of mobile phone functions and rapid development of smart wearable products, people are increasingly demanding outdoor readability of displays. In recent years, reflective liquid crystal displays have been widely used and developed. In addition, the application of electronic tags is more and more common, but electronic tags of traditional electronic ink types can only display black and white or a few colors. The total reflection liquid crystal display is applied more and more widely due to its low power consumption, multiple displayable colors, and high resolution, etc. The total reflection liquid crystal display has no backlight and achieves the display by reflection of ambient light. To increase the reflectivity and viewing angle, the incident light needs to be scattered. In current products, reflective electrodes on the thin film transistor (TFT) panel are generally flat electrodes, and the reflectivity and viewing angle are increased by adding a scattering film on the panel, which causes that an interface transmitted through by the incident light is thickened, light loss is increased and the cost is higher. In order to reduce the interface and cost, and increase the reflectivity at the same time, a reflective layer metal electrode with protrusions may be formed on the surface of the TFT. However, with respect to the reflective liquid crystal display with a raised reflective electrode on only the TFT surface, a dark side is prone to light leakage when viewed from a side view, thus increasing the brightness of the dark side, reducing the contrast ratio, and limiting an enlarging effect of the viewing angle.

SUMMARY

In view of the above problems in the related art, an object of the present disclosure is to provide a reflective liquid crystal display and a method for manufacturing the same, which can reduce light leakage of a dark side, increasing a contrast ratio, and expanding a viewing angle.

An arrangement of the present disclosure provides a reflective liquid crystal display. The reflective liquid crystal display includes an array substrate. The reflective liquid crystal display includes a plurality of raised reflective electrodes disposed on the array substrate. The reflective liquid crystal display includes a color film substrate. The reflective liquid crystal display includes a plurality of raised electrodes disposed on the color film substrate. The array substrate and the color film substrate are disposed opposite to each other, such that the raised reflective electrodes and the raised electrodes face each other.

In an arrangement, the raised reflective electrodes and the raised electrodes directly face each other or are mutually stagger.

In an arrangement, the raised reflective electrodes are circular protrusions or elliptical protrusions, and/or the raised electrodes are circular protrusions or elliptical protrusions.

In an arrangement, the raised reflective electrodes have a height from 0.5 μm to 5 μm and a diameter from 1 μm to 20 μm.

In an arrangement, the raised electrodes have a height from 0.1 μm to 2.0 μm and a diameter from 1 μm to 20 μm.

The present disclosure further discloses a method for manufacturing a reflective liquid crystal display. The method includes providing an array substrate. The method includes disposing a plurality of raised reflective electrodes on the array substrate. The method includes providing a color film substrate. The method includes disposing a plurality of raised electrodes on the color film substrate. The method includes forming a cell assembly with the array substrate and the color film substrate, such that the raised reflective electrodes and the raised electrodes face each other.

In an arrangement, disposing a plurality of raised reflective electrodes on the array substrate includes coating an organic layer on the array substrate, forming a plurality of first protrusions on a surface of the organic layer by exposure through a mask, and sputtering a reflective metal on the plurality of first protrusions to form the plurality of raised reflective electrodes.

In an arrangement, the first protrusions have raised interfaces with a height from 1.0 μm to 1.5 μm and a diameter from 8 μm to 10 μm.

In an arrangement, disposing a plurality of raised reflective electrodes on the array substrate includes mixing a silicon ball with organic materials and coating mixed materials on the array substrate; sputtering a reflective metal onto the mixed materials to form the plurality of raised reflective electrodes.

In an arrangement, the silicon ball has a diameter of 3.0 μm.

In an arrangement, disposing a plurality of raised electrodes on the color film substrate includes coating a flat layer on the color film substrate, forming a plurality of second protrusions on a surface of the flat layer by exposure through a mask, and manufacturing a transparent oxide conductive layer on the plurality of protrusions to form the plurality of raised electrodes.

In an arrangement, the second protrusions have raised interfaces with a height from 0.4 μm to 0.6 μm and a diameter from 5 μm to 10 μm.

In an arrangement, disposing a plurality of raised electrodes on the color film substrate includes mixing a silicon ball with materials of the flat layer, coating the materials of the flat layer mixed with the silicon ball on the color film substrate to form a flat layer including the silicon ball, and forming a transparent oxide conductive layer on the flat layer, to form the plurality of raised electrodes.

In an arrangement, the silicon ball has a diameter from 3.0 μm to 4.0 μm.

Through the reflective liquid crystal display and the method for manufacturing the same, an oblique electric field is formed while a vertical electric field is formed in a powered pixel region, which reduces light leakage at a dark side, improves a contrast ratio, and expands a viewing angle.

DETAILED DESCRIPTION

The present disclosure will be further described in detail below in conjunction with the accompanying drawings and arrangements. It is understood that the specific arrangements described herein are merely illustrative of the disclosure and are not intended to be limiting. It is also to be noted that, for the convenience of description, only some but not all of the structures related to the present disclosure are shown in the drawings.

Figure 1:
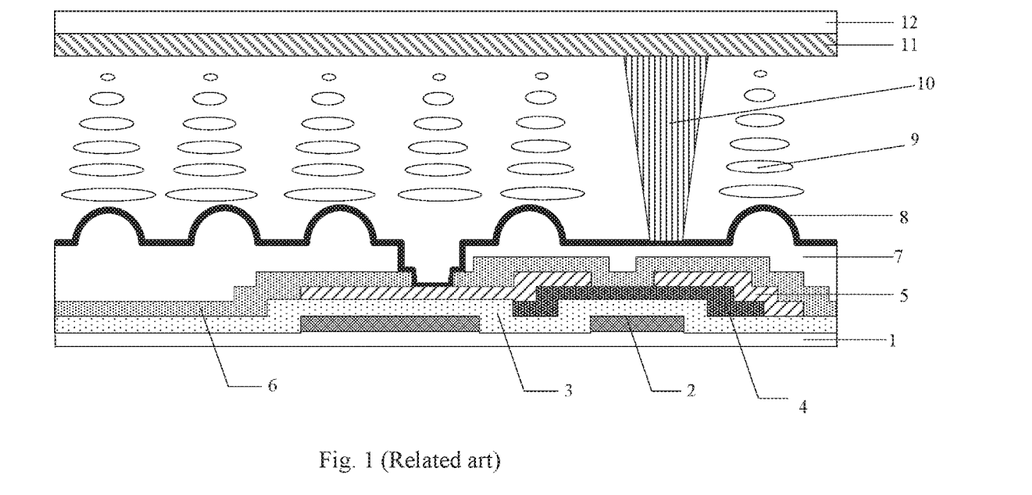
FIG. 1 is a schematic view showing a structure of a reflective liquid crystal display in the related art.

FIG. 1 is a schematic view showing a structure of a reflective liquid crystal display in the related art. The reflective liquid crystal display is a conventional liquid crystal display with raised reflective electrodes in the related art. As shown in FIG. 1, the reflective liquid crystal display includes: an array substrate 1; a gate layer 2 disposed on the array substrate 1; a gate insulating layer 3 disposed on the gate layer 2; an active layer 4 disposed on the gate insulating layer 3; a source/drain electrode layer 5 disposed on the active layer; a passivation layer 6 disposed on the active layer 4, the source/drain electrode layer 5, and the gate insulating layer; and an organic layer 7 disposed on the passivation layer 6. The organic layer includes a resin; a reflective electrode 8 disposed on the organic layer. The reflective electrode 8 is a raised structure. A color film substrate 12 is disposed opposite to the array substrate 1. A color film surface 11 is disposed on the color film substrate 12 and opposite to the array substrate 1. The color film surface 11 includes transparent indium tin oxide (ITO). Liquid crystals 9 is disposed between the color film substrate 12 and the array substrate 1. An isolation pillar 10 is disposed between the color film substrate 12 and the array substrate 1. The isolation pillar may be a Photo Spacer (PS) made of an organic transparent material which is elastic after being subjected to polymerization.

In the reflective liquid crystal display, only the reflective electrodes 8 provided on the surface of the array substrate are raised reflective electrodes, the electrodes on the color film surface 11 of the color film substrate 12 are flat electrodes.

Figure 2:
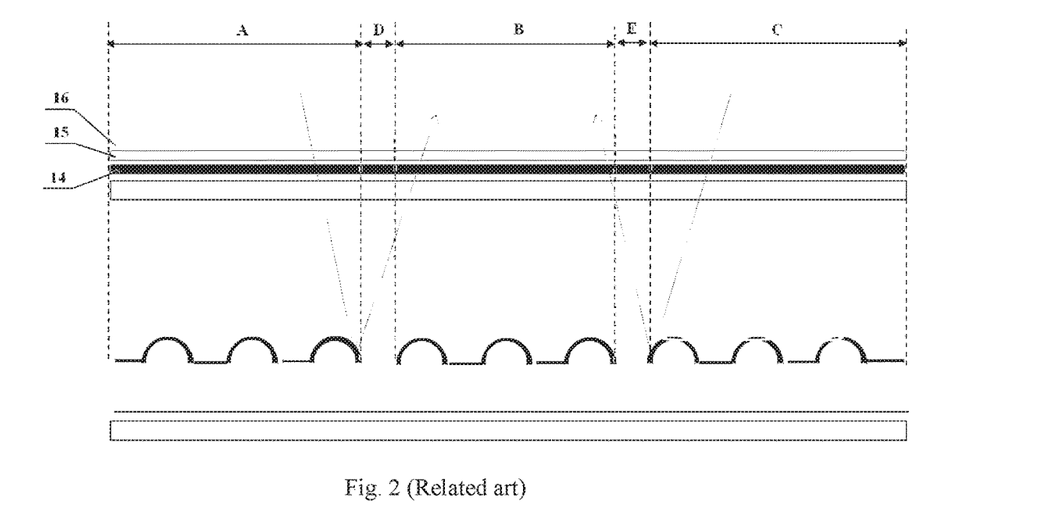
FIG. 2 is a schematic view showing a structure of a reflective liquid crystal display under an operating state according to the related art.

FIG. 2 is a schematic view showing a structure of a reflective liquid crystal display under an operating state according to the related art. Referring to FIG. 2, the color film substrate of the reflective liquid crystal display is further provided with a ¼λ wave plate 14, a ½λ wave plate 15 disposed on the ¼λ wave plate 14, and an upper polarizer 16 disposed on the ½λ wave plate 15.

In FIG. 2, "A" denotes an A pixel region, "B" denotes a B pixel region, "C" denotes a C pixel region, "D" denotes a region where there is no reflective metal electrode between the A pixel region and the B pixel region, and "E" denotes a region where there is no reflective metal electrode between the B pixel region and the C pixel region. In the operating state of the reflective liquid crystal display, for the purpose of display, some of these pixel regions are powered and others are not powered. In the example shown in FIG. 2, the A pixel region and the C pixel region are not powered, and a white state is displayed; the B pixel region is powered, and a black state is displayed.

As for the reflective liquid crystal display with raised reflective electrodes only on the surface of the TFT substrate in the related art, there is only a slight oblique electric field in the D region and the E region, and liquid crystal molecules are slightly inclined in the two regions, which is similar to the liquid crystal molecule arrangement of the unpowered A pixel region and the unpowered C pixel region. When viewed from the side view, reflected light of incident light of the A pixel region and the C pixel region enters the human eye of the B pixel region, causing light leakage, resulting in reflectivity of black-state pixels in the B pixel region increased. That is, the brightness of the dark state is increased, thus reducing the contrast ratio, reducing the viewing angle, and affecting the display effect.

In order to solve the above problems in the related art, the present arrangement provides a reflective liquid crystal display. In the reflective liquid crystal display, raised reflective electrodes are disposed on a surface of the thin film transistor (TFT) substrate, while raised electrodes are also disposed on a surface of the color film substrate opposite to the TFT substrate.

Figure 3:
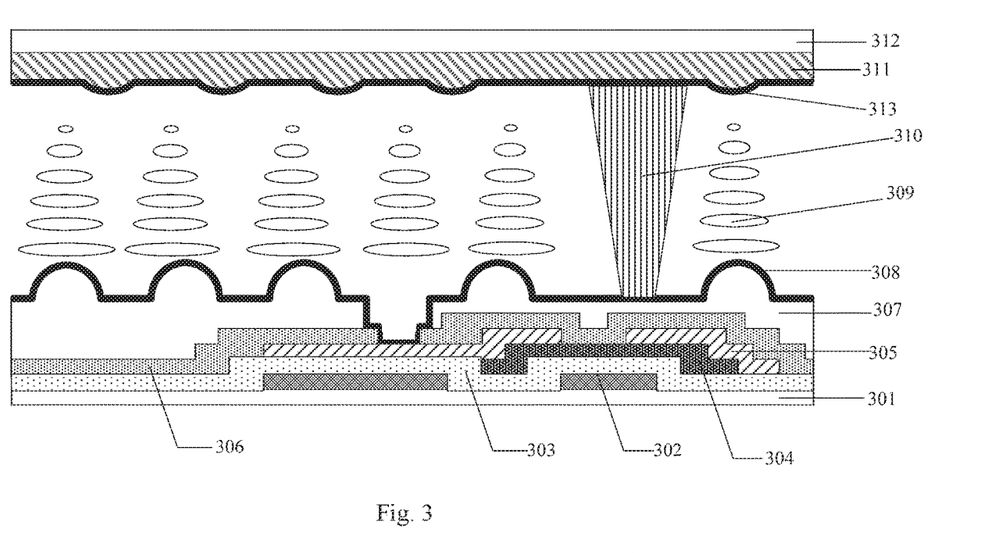
FIG. 3 is a schematic view showing a structure of a reflective liquid crystal display according to an arrangement of the present disclosure.

FIG. 3 is a schematic view showing a structure of a reflective liquid crystal display according to an arrangement of the present disclosure. As shown in FIG. 3, the reflective liquid crystal display includes: an array substrate 301; a gate layer 302 disposed on the array substrate 301; a gate insulating layer 303 disposed on the gate layer 302; an active layer 304 disposed on the gate insulating layer 303; a source/drain electrode layer 305 disposed on the active layer 304; a passivation layer 306 disposed on the active layer 304, the source/drain electrode layer 305, and the gate insulating layer 303; an organic layer 307 disposed on the passivation layer 306; a reflective electrode 308 disposed on the organic layer 307; a color film substrate 312 disposed opposite to the array substrate 301; a planar layer 311 disposed on the color film substrate 312 and facing the array substrate 301; a raised electrodes 313 disposed on the planar layer 311 and facing the array substrate 301; liquid crystals 309 disposed between the color film substrate 312 and the array substrate 301; and an isolation pillar 310 disposed between the color film substrate 312 and the array substrate 311. In some arrangements, the organic layer 307 includes a resin; the reflective electrode 308 is a raised structure; the planar layer 311 is generally made of an organic transparent material; the material of the raised electrode 313 may be a conductive transparent oxide, such as transparent indium tin oxide (ITO); and the isolation pillar may be a Photo Spacer (PS) made of an organic transparent material which is elastic after being subjected to polymerization.

In the reflective liquid crystal display of the arrangement of the present disclosure, a plurality of raised reflective electrodes 308 are disposed on the array substrate 301; a plurality of raised electrodes 313 are disposed on the color film substrate 312; the raised reflective electrodes 308 and the raised electrodes 313 face each other. The raised reflective electrodes 308 and the raised electrodes 313 may directly face each other, that is, one raised reflective electrode 308 and one raised electrode 313 directly face each other. In other words, the orthographic projection of the raised reflective electrodes 308 is overlapped with that of the raised electrodes 313. The raised reflective electrodes 308 and the raised electrodes 313 may also be mutually stagger, that is, one raised reflective electrode 308 is directly opposite to a position of the spacing between adjacent two raised electrodes 313. In other words, the orthographic projection of the raised reflective electrodes 308 is between those of the adjacent two raised electrodes 313.

Figure 4:
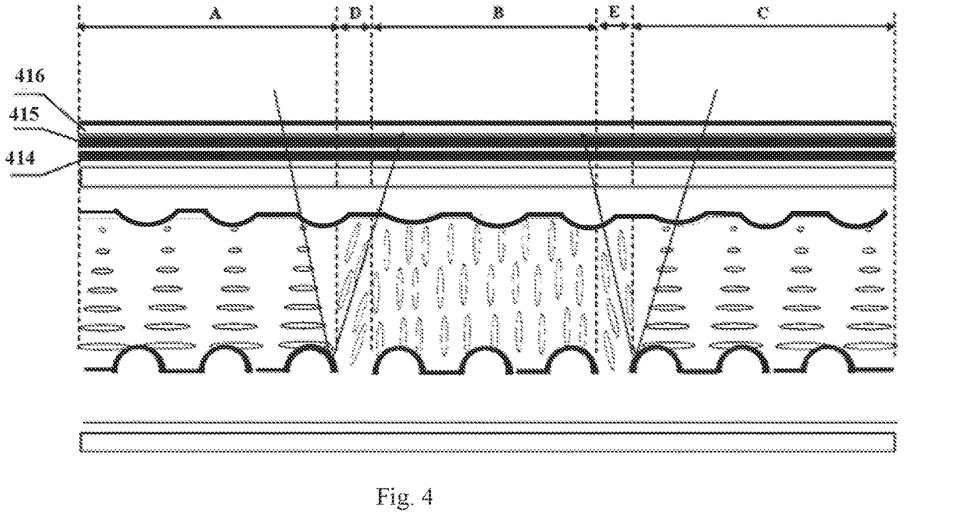
FIG. 4 is a schematic view showing a structure of a reflective liquid crystal display under an operating state according to an arrangement of the present disclosure.

FIG. 4 is a schematic view showing a structure of a reflective liquid crystal display under an operating state according to an arrangement of the present disclosure. Referring to FIG. 4, the color film substrate of the reflective liquid crystal display is further provided with a ¼λ wave plate 414, a ½λ wave plate 415 disposed on the ¼λ wave plate 414, and an upper polarizer 416 disposed on the ½λ wave plate 415.

In FIG. 4, A denotes an A pixel region, B denotes a B pixel region, C denotes a C pixel region, D denotes a region between the A pixel region and the B pixel region, and E denotes a region between the B pixel region and the C pixel region. In the operating state of the reflective liquid crystal display, for the purpose of display, some of these pixel regions are powered and others are not powered. In the example shown in FIG. 4, the A pixel region and the C pixel region are not powered, and a white state is displayed; the B pixel region is powered, and a black state is displayed.

In the reflective liquid crystal display of the present arrangement, the color film substrate is provided with the raised electrode 313, meanwhile, the TFT substrate is provided with the raised reflective electrode 308. Since the upper and lower electrodes are both raised structures, a strong oblique electric field is formed in the D region and the E region. Liquid crystal molecules of the two regions are arranged obliquely along with a direction of a solid line. That is, a propagation direction of light reflected from the TFT substrate does not change, and thus cannot pass through from the upper polarizer 416. When viewed from the side view, reflected light of incident light of the A pixel region and the C pixel region cannot enter the human eye of the B pixel region, thus decreasing reflectivity of black-state pixels in the B pixel region, improving the contrast ratio, and enlarging the viewing angle.

Figure 5:
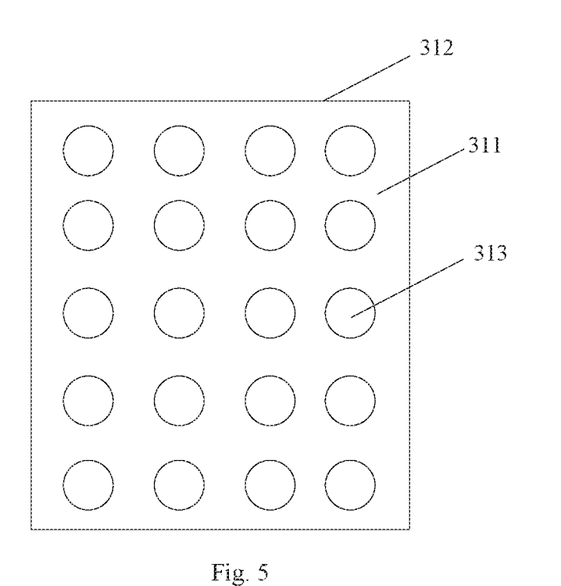
FIG. 5 is a top plan view showing a structure of a color film substrate of a reflective liquid crystal display according to an arrangement of the present disclosure.

FIG. 5 is a top plan view showing a structure of a color film substrate of a reflective liquid crystal display according to an arrangement of the present disclosure. The raised electrode 313 on the flat layer 311 of the color film substrate 312 may be a conductive transparent oxide, such as indium tin oxide (ITO), aluminum zinc oxide (AZO), zinc oxide (ZnO), etc., and the shape thereof is circular or elliptical. Specifically, a cross-sectional shape thereof is an arc shape, and its shape viewed from the plan view is circular or elliptical. The raised electrode 311 has a diameter from 1 μm to 20 μm and a height from 0.1 μm to 2.0 μm.

Figure 6:
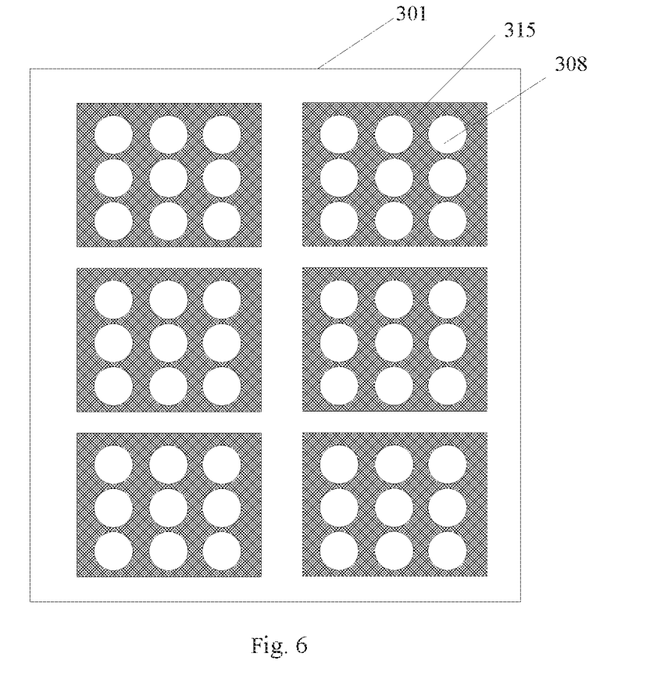
FIG. 6 is a top plan view showing a structure of an array substrate of a reflective liquid crystal display according to an arrangement of the present disclosure.

FIG. 6 is a top plan view showing a structure of an array substrate of a reflective liquid crystal display according to an arrangement of the present disclosure. The material of the raised reflective electrode 308 in the reflective metal pixel electrode 315 on the array substrate 301 may be a metal having a high reflectivity and have a circular or elliptical shape. Specifically, a cross-sectional shape thereof is an arc shape, and its shape viewed from the plan view is circular or elliptical. The raised reflective electrode 308 has a diameter from 1 μm to 20 μm and a height from 0.5 μm to 5 μm.

In the present arrangement, in the reflective liquid crystal display structure in which the color film substrate has the raised electrode 313 and the TFT substrate also has the raised reflective electrode 308, an oblique electric field is also formed while a vertical electric field is formed in a powered pixel region, which reduces light leakage at a dark side, improves a contrast ratio between the powered pixel region and the unpowered pixel region, and expands a viewing angle.

The present arrangement provides a manufacturing method for manufacturing a reflective liquid crystal display in an arrangement of the present disclosure. The method includes following steps.

In step a, sequentially forming a gate layer 302, a gate insulating layer 303, an active layer 304, a source/drain electrode layer 305, a passivation layer (PVX) 306 on an array substrate 301, and then coating an organic layer 307. The organic layer 307 may have a material of resin and have a thickness of 2.0 μm.

In step b, performing exposure through a mask, such that a raised interface having a height of 1.0 μm and a diameter of 10 μm is formed on a surface of the organic layer 307 formed in the step a.

In step c, sputtering a reflective metal, such as Al, Ag, etc., on the organic layer 307 formed in step b, to form a raised reflective electrode 308.

In step d, sequentially coating a black matrix, blue color resistance, green color resistance, red color resistance and flat layer (OC) 311 on the color film substrate 312.

In step e, performing exposure through a mask, such that a raised interface having a height of 0.4 μm and a diameter of 10 μm is formed on a surface of the flat layer 311 formed in the step d.

In step f, manufacturing an ITO layer on the color film substrate formed in the step e, to cover the raised interface formed in the step e, and forming an ITO raised electrode 313.

In step g, coating a sealant SWB-73 on the color film substrate 312 formed in the step f, performing photophobic operation, and coating the mixture uniformly.

In step h, dripping MAT-05-575 liquid crystals on the array substrate 301 having the raised reflective electrode 308 formed in the step c.

In step i, forming a cell assembly by the array substrate 301 on which the liquid crystals are dripped and the color film substrate 312 coated with the sealant mixture, and then performing ultraviolet polymerization and thermal polymerization to produce a reflective liquid crystal display having a high reflectivity and wide viewing angle.

The present arrangement provides another manufacturing method for manufacturing the reflective liquid crystal display in the arrangement of the present disclosure. The method includes following steps.

In step a, mixing a silicon ball having a diameter of 3.0 μm with an organic material (for example, a resin) at a mass ratio of 5.0 Wt % uniformly.

In step b, sequentially forming a gate layer 302, a gate insulating layer 303, an active layer 304, a source/drain electrode layer 305, a passivation layer (PVX) 306 on the array substrate 301, and then coating the mixed material formed in the step a to form an organic layer 307. A thickness of the coating is 1.5 μm.

In step c, sputtering a reflective metal silver or aluminum on the organic layer 307. A portion of the reflective metal covering the silicon ball forms a raised reflective electrode 308, and a diameter of the raised reflective electrode 308 is 3.5 μm.

In step d, sequentially coating a black matrix, blue color resistance, green color resistance, red color resistance and flat layer (OC) 311 on the color film substrate 312.

In step e, performing exposure through a mask, such that a raised interface having a height of 0.6 μm and a diameter of 5 μm is formed on a surface of the flat layer 311 formed in the step d.

In step f, manufacturing an ITO layer on the color film substrate formed in the step e, to cover the raised interface formed in the step e, and forming an ITO raised electrode 313.

In step g, coating a sealant SWB-66 on the color film substrate 312 formed in the step f, performing photophobic operation, and coating the mixture uniformly.

In step h, dripping ZBE-5047 liquid crystals on the array substrate 301 having the raised reflective electrode 308 formed in the step c.

In step i, forming a cell assembly by the array substrate 301 on which the liquid crystals are dripped and the color film substrate 312 coated with the sealant mixture, and then performing ultraviolet polymerization and thermal polymerization to produce a reflective liquid crystal display having a high reflectivity and wide viewing angle.

The present arrangement provides another manufacturing method for manufacturing the reflective liquid crystal display in the arrangement of the present disclosure. The method includes following steps.

In step a, sequentially forming a gate layer 302, a gate insulating layer 303, an active layer 304, a source/drain electrode layer 305, a passivation layer (PVX) 306 on an array substrate 301, and then coating an organic layer 307. The organic layer 307 may be made of resin and have a thickness of 2.0 μm.

In step b, performing exposure through a mask, such that a raised interface having a height of 1.5 μm and a diameter of 8 μm is formed on a surface of the organic layer 307 formed in the step a.

In step c, sputtering a reflective metal, such as Al, Ag, etc., on the organic layer 307 formed in step b, to form a raised reflective electrode 308.

In step d, mixing a silicon ball having a diameter of 2.5 μm with a material forming a flat layer (OC) by a mass ratio of 3.0 Wt % uniformly, to obtain a flat layer containing the silicon ball.

In step e, sequentially coating a black matrix, blue color resistance, green color resistance, red color resistance and the flat layer formed in the step d on the color film substrate 312.

In step f, manufacturing an ITO layer on the color film substrate 312 formed in the step e. The ITO layer covers on the silicon ball in the flat layer formed in the step e, to form an ITO raised electrode 313 having a diameter of 3 μm.

In step g, coating a sealant SWB-73 on the color film substrate 312 formed in the step f, performing photophobic operation, and coating the mixture uniformly.

In step h, dripping SLC10T12L01 liquid crystals on the array substrate 301 having the raised reflective electrode 308 formed in the step c.

In step i, forming a cell assembly by the array substrate 301 on which the liquid crystals are dripped and the color film substrate 312 coated with the sealant mixture, and then performing ultraviolet polymerization and thermal polymerization to produce a reflective liquid crystal display having a high reflectivity and wide viewing angle.

The present arrangement provides another manufacturing method for manufacturing the reflective liquid crystal display in the arrangement of the present disclosure. The method includes following steps.

In step a, mixing a silicon ball having a diameter of 3.0 μm with an organic material (for example, a resin) at a mass ratio of 5.0 Wt % uniformly.

In step b, sequentially forming a gate layer 302, a gate insulating layer 303, an active layer 304, a source/drain electrode layer 305, a passivation layer (PVX) 306 on the array substrate 301, and then coating the mixed material formed in the step a to form an organic layer 307. A thickness of the coating is 2.0 μm.

In step c, sputtering a reflective metal silver or aluminum on the organic layer 307. A portion of the reflective metal covering the silicon ball forms a raised reflective electrode 308, and a diameter of the raised reflective electrode 308 is 5.5 μm.

In step d, mixing a silicon ball having a diameter of 4.0 μm with a material forming a flat layer (OC) by a mass ratio of 3.0 Wt % uniformly, to obtain a flat layer containing the silicon ball.

In step e, sequentially coating a black matrix, blue color resistance, green color resistance, red color resistance and the flat layer formed in the step d on the color film substrate 312.

In step f, manufacturing an ITO layer on the color film substrate 312 formed in the step e. The ITO layer is covered on the silicon ball in the flat layer formed in the step e, and forming an ITO raised electrode 313 having a diameter of 4.5 μm.

In step g, coating a sealant SWB-66 on the color film substrate 312 formed in the step f, performing photophobic operation, and coating the mixture uniformly.

In step h, dripping BOE-81201 liquid crystals on the array substrate 301 having the raised reflective electrode 308 formed in the step c.

In step i, forming a cell assembly by the array substrate 301 on which the liquid crystals are dripped and the color film substrate 312 coated with the sealant mixture, and then performing ultraviolet polymerization and thermal polymerization to produce a reflective liquid crystal display having a high reflectivity and wide viewing angle.

In the method for manufacturing the reflective liquid crystal display of the present disclosure provided by the above arrangements, as for the raised electrode of the color film substrate, the ITO raised electrode may be formed by forming a raised flat layer (OC) interface on the color film substrate, and then coating the ITO, and performing mask and exposure; or an ITO raised electrode with a controllable curvature and height may also be formed by doping a silicon ball in the flat layer, forming a raised interface of the flat layer with a controllable large curvature and a high height on the surface of the flat layer, and further coating the ITO at the raised interface.

As for the raised reflective electrode of the array substrate, the raised reflective electrode may be formed by forming a raised organic layer interface on the TFT substrate through mask and exposure, and then sputtering a reflective metal at the protrusions; or a raised reflective electrode with a controllable curvature and height may also be formed by doping a silicon ball in the organic layer, forming an organic raised interface with a controllable large curvature and a high height on the surface of the organic layer, and further sputtering the reflective metal at the organic raised interface.

It is noted that the foregoing is only preferred arrangements of the present disclosure and the principles of the employed techniques. It should be understood by those skilled in the art that the present disclosure is not limited to the specific arrangements described herein, and that various obvious changes, readjustments and substitutions may be made without departing from the scope of the disclosure. Therefore, although the present disclosure has been described in detail by the above arrangements, the present disclosure is not limited to the above arrangements, and further equivalent arrangements may be included without departing from the conception of the present disclosure. The scope of the present disclosure is determined by the appended claims.

What is claimed is:

1. A reflective liquid crystal display, comprising:
    an array substrate;
    a plurality of raised reflective electrodes disposed on the array substrate, and the plurality of raised reflective electrodes acting as pixel electrodes;
    a color film substrate; and
    a plurality of raised transparent metal oxide electrodes disposed on the color film substrate; wherein the array substrate and the color film substrate are disposed opposite to each other such that the plurality of raised reflective electrodes and the plurality of raised transparent metal oxide electrodes face each other, each of the plurality of raised reflective electrodes is in one-to-one correspondence with each of the plurality of raised transparent metal oxide electrodes, and a projection of each of the plurality of raised reflective electrodes overlap or partially overlap with a projection of corresponding one of the plurality of raised transparent metal oxide electrodes, the plurality of raised reflective electrodes and the plurality of raised transparent metal oxide electrodes are similar in size and shape, the plurality of raised reflective electrodes and the plurality of raised transparent metal oxide electrodes are circular protrusions or elliptical protrusions, and the bump is round or oval, the plurality of raised reflective electrodes have a height from 0.5 μm to 5 μm and a diameter from 1 μm to 20 μm, and the plurality of raised transparent metal oxide electrodes has a height from 0.1 μm to 2.0 μm and a diameter from 1 μm to 20 μm; and
    the plurality of raised reflective electrodes and the plurality of raised transparent metal oxide electrodes are powered, an electric field is formed to drive the liquid crystal layer to rotate, to reduce light leakage at a dark side, improves a contrast ratio, and expand a viewing angle.

2. The reflective liquid crystal display according to claim 1, wherein the plurality of raised reflective electrodes and the plurality of raised transparent metal oxide electrodes directly face each other or are mutually staggered.

3. A method for manufacturing a reflective liquid crystal display, comprising:
    providing an array substrate;
    disposing a plurality of raised reflective electrodes on the array substrate;
    providing a color film substrate;
    disposing a plurality of raised transparent metal oxide electrodes on the color film substrate; and
    forming a cell assembly with the array substrate and the color film substrate such that the plurality of raised reflective electrodes and the plurality of raised transparent metal oxide electrodes face each other; wherein each of the plurality of raised reflective electrodes is in one-to-one correspondence with each of the plurality of raised transparent metal oxide electrodes, and a projection of each of the plurality of raised reflective electrodes overlap or partially overlap with a projection of corresponding one of the plurality of raised transparent metal oxide electrodes, the plurality of raised reflective electrodes and the plurality of raised transparent metal oxide electrodes are similar in size and shape, the plurality of raised reflective electrodes and the plurality of raised transparent metal oxide electrodes are circular protrusions or elliptical protrusions, and the bump is round or oval, the plurality of raised reflective electrodes have a height from 0.5 μm to 5 μm and a diameter from 1 μm to 20 μm, and the plurality of raised transparent metal oxide electrodes has a height from 0.1 μm to 2.0 μm and a diameter from 1 μm to 20 μm; and
    the plurality of raised reflective electrodes and the plurality of raised transparent metal oxide electrodes are powered, an electric field is formed to drive the liquid crystal layer to rotate, to reduce light leakage at a dark side, improves a contrast ratio, and expand a viewing angle.

4. The method for manufacturing a reflective liquid crystal display according to claim 3, wherein disposing a plurality of raised reflective electrodes on the array substrate comprises:
    coating an organic layer on the array substrate;
    forming a plurality of first protrusions on a surface of the organic layer by exposure through a mask; and
    sputtering a reflective metal on the plurality of first protrusions to form the plurality of raised reflective electrodes.

5. The method for manufacturing a reflective liquid crystal display according to claim 4, wherein the plurality of first protrusions have raised interfaces with a height from 1.0 μm to 1.5 μm and a diameter from 8 μm to 10 μm.

6. The method for manufacturing a reflective liquid crystal display according to claim 3, wherein disposing a plurality of raised reflective electrodes on the array substrate comprises:
    mixing a silicon ball with organic materials;
    coating mixed materials on the array substrate; and
    sputtering a reflective metal onto the mixed materials to form the plurality of raised reflective electrodes.

7. The method for manufacturing a reflective liquid crystal display according to claim 6, wherein the silicon ball has a diameter of 3.0 μm.

8. The method for manufacturing a reflective liquid crystal display according to claim 3, wherein disposing a plurality of raised transparent metal oxide electrodes on the color film substrate comprises:
    coating a flat layer on the color film substrate;
    forming a plurality of second protrusions on a surface of the flat layer by exposure through a mask; and
    manufacturing a transparent oxide conductive layer on the plurality of protrusions, to form the plurality of raised transparent metal oxide electrodes.

9. The method for manufacturing a reflective liquid crystal display according to claim 8, wherein the plurality of second protrusions have raised interfaces with a height from 0.4 μm to 0.6 μm and a diameter from 5 μm to 10 μm.

10. The method for manufacturing a reflective liquid crystal display according to claim 3, wherein disposing a plurality of raised transparent metal oxide electrodes on the color film substrate comprises:

mixing a silicon ball with materials of a flat layer;

coating the materials of the flat layer mixed with the silicon ball on the color film substrate, to form a flat layer comprising the silicon ball; and forming a transparent oxide conductive layer on the flat layer to form the plurality of raised transparent metal oxide electrodes.

11. The method for manufacturing a reflective liquid crystal display according to claim 10, wherein the silicon ball has a diameter from 3.0 μm to 4.0 μm.

* * * * *